(12) United States Patent
Kang et al.

(10) Patent No.: US 7,864,886 B2
(45) Date of Patent: Jan. 4, 2011

(54) PHASE CALCULATION APPARATUS USING BINARY SEARCH

(75) Inventors: Hun Sik Kang, Daejeon (KR); Do Young Kim, Daejeon (KR)

(73) Assignee: Electronics and Telecommunications Research Institute (KR)

(*) Notice: Subject to any disclaimer, the term of this patent is extended or adjusted under 35 U.S.C. 154(b) by 992 days.

(21) Appl. No.: 11/634,554

(22) Filed: Dec. 6, 2006

(65) Prior Publication Data

US 2007/0127596 A1    Jun. 7, 2007

(30) Foreign Application Priority Data

Dec. 7, 2005 (KR) .................. 10-2005-0118636
Sep. 29, 2006 (KR) .................. 10-2006-0096630

(51) Int. Cl.
*H04L 27/00* (2006.01)
*G06F 7/38* (2006.01)
*G06F 1/02* (2006.01)

(52) U.S. Cl. .................. 375/316; 708/440; 708/441; 708/605; 708/270; 708/276

(58) Field of Classification Search .................. 375/260, 375/316, 369; 708/440, 441, 605
See application file for complete search history.

(56) References Cited

U.S. PATENT DOCUMENTS

| | | | | |
|---|---|---|---|---|
| 4,599,701 A | * | 7/1986 | Vojir et al. | 708/605 |
| 4,692,889 A | * | 9/1987 | McNeely | 708/441 |
| 5,603,112 A | * | 2/1997 | Gabato et al. | 455/226.2 |
| 5,648,924 A | * | 7/1997 | Smith | 708/440 |
| 6,385,633 B1 | * | 5/2002 | Schmidl | 708/441 |
| 6,658,445 B1 | * | 12/2003 | Gau et al. | 708/605 |
| 7,379,957 B2 | * | 5/2008 | Tien et al. | 708/605 |
| 2002/0065861 A1 | * | 5/2002 | Kim et al. | 708/270 |

FOREIGN PATENT DOCUMENTS

| | | |
|---|---|---|
| JP | 2000-151735 | 5/2000 |
| KR | 1995-0016115 | 6/1995 |
| KR | 2002-0024937 | 4/2002 |
| KR | 2003-0049532 | 6/2003 |
| KR | 10-2005-0034166 | 4/2005 |

* cited by examiner

*Primary Examiner*—Mohammad H Ghayour
*Assistant Examiner*—Eboni Giles
(74) *Attorney, Agent, or Firm*—Blakely, Sokoloff, Taylor & Zafman

(57) ABSTRACT

A phase calculation apparatus using a binary search is provided. The phase calculation apparatus includes a quarter surface preprocessor determining the bigger one between an absolute value of I component data and an absolute value of Q component data as horizontal component data and the smaller one as perpendicular component data, and detecting information on a phase region indicating an $m^{th}$ (m=1 to 8) phase region (the $m^{th}$ phase region is between (m−1) π/4 and m π/4 in which the I/Q component data are located; a phase representative value detector detecting phase representative values x corresponding to the horizontal component data and the perpendicular component data; and a quarter surface postprocessor calculating phase values of the I/Q component data based on the detected information about the phase region and the detected phase representative values x. The phase can be calculated using a limited memory, low complexity of calculation and regardless of the number of bits of I/Q component data.

3 Claims, 9 Drawing Sheets

PHASE CALCULATION APPARATUS USING BINARY SEARCH

CROSS-REFERENCE TO RELATED PATENT APPLICATION

This application claims the benefit of Korean Patent Application No. 10-2005-0118636, filed on Dec. 7, 2005, and Korean Patent Application No. 10-2006-0096630, filed on Sep. 29, 2006 in the Korean Intellectual Property Office, the disclosures of which are incorporated herein in their entirety by reference.

BACKGROUND OF THE INVENTION

1. Field of the Invention

The present invention relates to a phase calculation apparatus, and more particularly to, an apparatus for calculating a phase corresponding to I/Q data components which are signals received during wireless/wired communication.

2. Description of the Related Art

Signals transmitted during wireless/wired communication include I/Q component data. Frequency deviation occurs due to a difference between carrier frequencies between a reception side and a transmission side. The frequency deviation may greatly influence the restoration of data received according to a modulation type. The received data can be properly restored only if the frequency deviation is compensated for in types of communication such as orthogonal frequency division multiplexing (OFDM) or wideband code division multiplexing access (CDMA). In order to compensate for the frequency deviation, the reception side must estimate the frequency deviation by detecting a phase of an input complex signal during a specific signal period, e.g., a preamble period. Therefore, the phase needs to be accurately detected in order to increase frequency deviation compensation performance. In order to estimate the frequency deviation, the phase of the input complex signal, i.e., the I/Q component data, needs to be calculated. A conventional phase calculation method uses a memory or lookup table as a value of arctan (the I/Q component data) if the input complex signal includes the I/Q component data. However, the conventional phase calculation method must store phase values of I/Q data component data values having the same phase values in the memory, which causes unnecessary memory use, and must also store the number of bits of the I/Q data component data values to be determined according to the accuracy of the phase calculation.

SUMMARY OF THE INVENTION

The present invention provides a phase calculation apparatus that has limited memory and low complexity of calculation, and excellent phase calculation performance without being influenced by the number of bits of I/Q component data.

According to an aspect of the present invention, there is provided a phase calculation apparatus comprising: a quarter surface preprocessor determining the bigger one between an absolute value of I component data and an absolute value of Q component data as horizontal component data and the smaller one as perpendicular component data, and detecting information on a phase region indicating an $m^{th}$ (m=1, through to 8) phase region (the $m^{th}$ phase region is between $(m-1)\pi/4$ and $m\pi/4$ in which the I/Q component data are located; a phase representative value detector detecting phase representative values x corresponding to the horizontal component data and the perpendicular component data; and a quarter surface postprocessor calculating phase values of the I/Q component data based on the detected information on the phase region and the detected phase representative values x.

The phase representative value detector may comprise: a phase representative value storage unit storing phase representative values corresponding to phases of $2^N$ partial regions into which a first phase region is divided, and outputting phase representative values corresponding to input addresses $A_{N-1}A_{N-2}$ through to $A_0$ among the stored phase representative values; an address generator determining, if the perpendicular component data is larger than an $n^{th}$ (n=1, through to N) reference value, a value of $A_{N-n}$ as a first binary value, and if the perpendicular component data is smaller than or identical to the $n^{th}$ (n=1, through to N) reference value, determining the value of $A_{N-n}$ as a second binary value, and generating the addresses; and a reference value generator providing the address generator with ½ of the perpendicular component data as a first reference value, if the value of $A_{N-n}$ is the first binary value, ⅔ of the $n^{th}$ (n=1, through to N-1) reference value as the $n^{th}$ (n=2, through to N) reference value, and, if the value of $A_{N-n}$ is the second binary value, ½ of the $n^{th}$ (n=1, through to N-1) reference value as the $n^{th}$ (n=2, through to N) reference value.

The information on quarter surfaces of the I/Q component data and a result obtained by comparing the absolute value of the I component data and the absolute value of the Q component data may be used as the information on the phase region.

The quarter surface postprocessor, if the I/Q component data belong to first through eighth phase regions, may determine x, $\pi/2-x$, $\pi/2+x$, $\pi-x$, $-\pi+x$, $-\pi/2-x$, $-\pi/2+x$ and $-x$ as the phase values of the I/Q component data, based on the information on the phase region.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
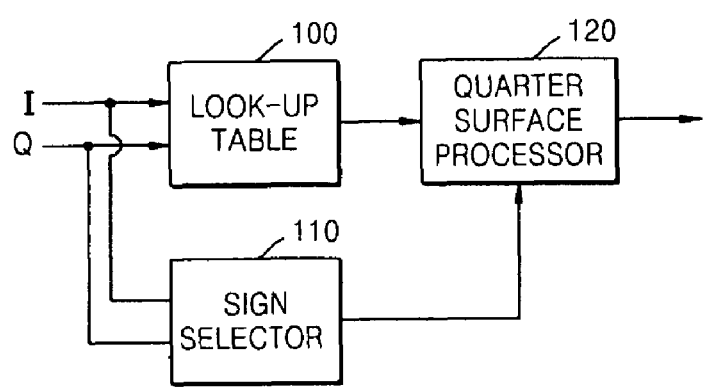
FIGS. 1A and 1B are block diagrams illustrating a phase calculation apparatus.
Figure 1B:
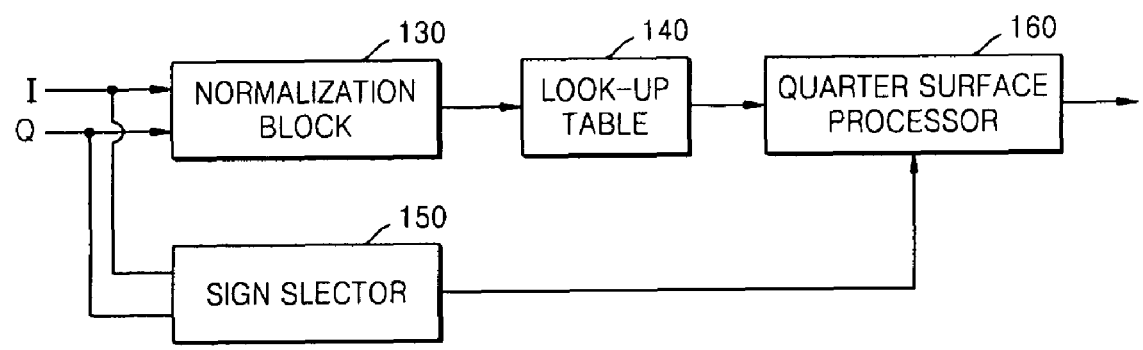

FIGS. 1A and 1B are block diagrams illustrating a phase calculation apparatus. Referring to FIG. 1A, a look-up table 100 outputs first quarter phase values corresponding to I/Q component data included in a received complex signal. In detail, the look-up table 100 stores phase representative values between 0 to π/2. A sign selector 110 detects information on a quarter surface in which the I/Q component data is located using code values of the I/Q component data. A quarter surface processor 120 calculates phases of the I/Q component data based on the values output by the look-up table 100 and the information on the quarter surface. In detail, the quarter surface processor 120 uses symmetrical relations to calculate the phases of the I/Q component data. That is, if the information on the quarter surface relates to a first quarter surface, the values output by the look-up table 100 are the phases of the I/Q component data, if the information on the quarter surface relates to a second quarter surface, the sum of the values output by the look-up table 100 and π/2 are the phases of the I/Q component data, if the information on the quarter surface relates to a third quarter surface, the sum of the values output by the look-up table 100 and −π are the phases of the I/Q component data, and if the information on the quarter surface relates to a fourth quarter surface, the sum of the values output by the look-up table 100 and −π/2 are the phases of the I/Q component data. However, since input values of the I/Q component data are used by the look-up table 100, the look-up table 100 must have a considerable size in order to more accurately calculate the phase values.

Referring to FIG. 1B, a phase calculation apparatus further comprises a normalization block 130, which is different compared with the phase calculation apparatus illustrated in FIG. 1A. Therefore, a sign selector 150 and a quarter surface processor 160 have the same function and operation as the sign selector 110 and the quarter surface processor 130 illustrated in FIG. 1A. The normalization block 130 performs standardization that divides the Q component data into I component data. A look-up table 140 outputs an arctan value corresponding to the output of the normalization block 130. Although the size of the look-up table 140 may be smaller than that of the look-up table 100 illustrated in FIG. 1A, since the phase calculation apparatus illustrated in FIG. 1A must comprise the normalization block 130 that performs a division operation, the complexity of calculation increases.

Figure 2:
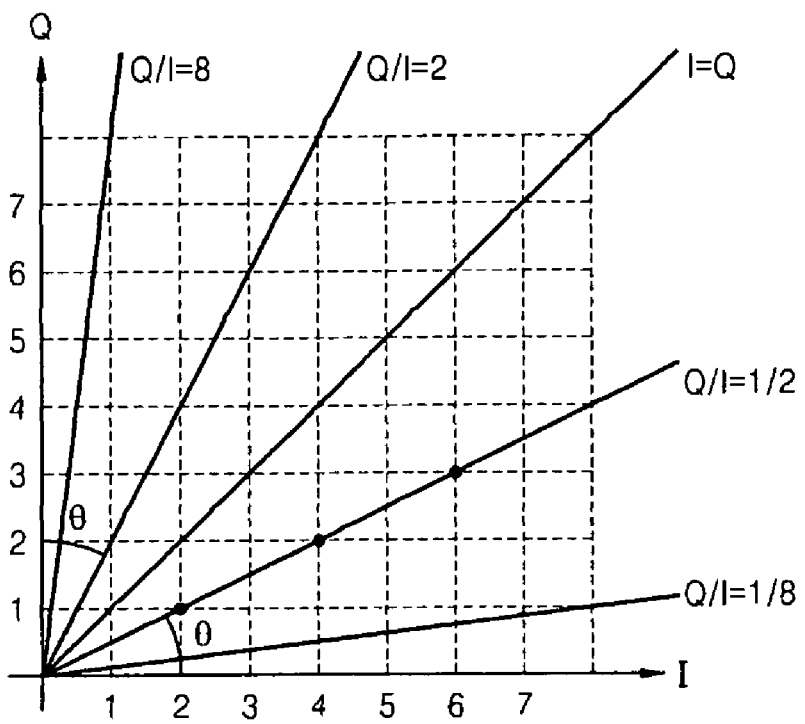
FIG. 2 is a graph for explaining a look-up table illustrated in FIG. 1A.

FIG. 2 is a graph for explaining the look-up table 100 illustrated in FIG. 1A. The look-up table 100 is required not to use the normalization block 130 that performs the division operation. Referring to FIG. 2, each pair of I/Q component data corresponding to the same phase is stored in the look-up table 100 or a memory. Therefore, a lot of pairs of the I/Q component data corresponding to the same phase values must be stored in the look-up table 100 or the memory. For example, when each piece of the I/Q component data is expressed as 3 bits, pairs of the I/Q component data (2,1), (4,2), and (6,3) have the same phase in a straight line at an inclination Q/I=½. However, each of the pairs (2,1), (4,2), and (6,3) needs to be stored in the memory, which increases the amount of memory used. In particular, the greater the bit resolution of the I/Q component data is, the more memory is used. Also, the correctness of the calculated phase is proportional to the bit resolution of the I/Q component data, which causes the amount of memory used to increase. To address these defects, the present invention suggests a phase calculation apparatus that does not have a redundant look-up table or memory that stores an input value having the same phase but has the accuracy of the phase independent from the bit resolution of the I/Q component data.

Figure 3:
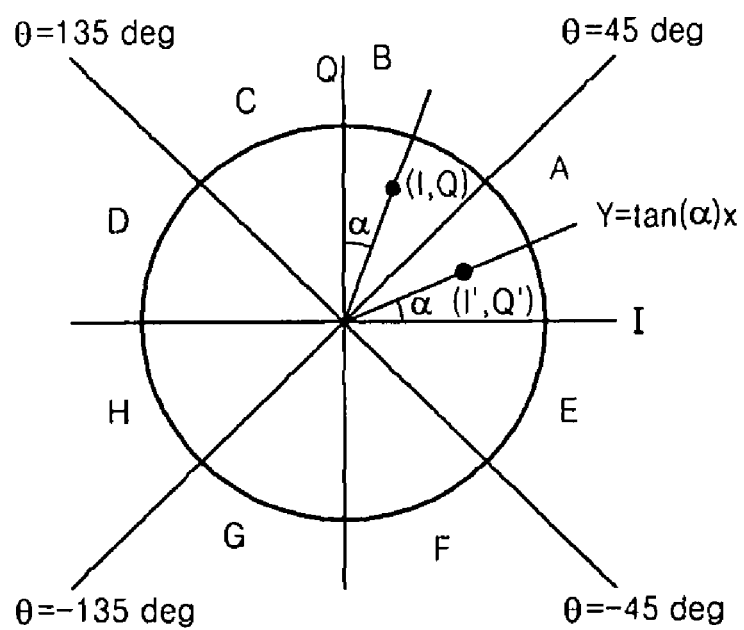
FIG. 3 is a graph for explaining a symmetrical relationship according to an embodiment of the present invention.

FIG. 3 is a graph for explaining a symmetrical relation according to an embodiment of the present invention. Referring to FIG. 3, a point (I, Q) on a complex plane can be expressed as a phase in a region in the range of 0 to π/4. When a phase having a value between (m−1) π/4 and m π/4 is located in an $m^{th}$ phase region (m=1 to 8), an angle of the point (I, Q) located in a second phase region is π/2−a (i.e., an angle a forms between the point (I,Q) and a Q axis), which can be expressed using a relation formula of the angle a of a point (I',Q') in a first phase region and π/2. In detail, an angle of a point located in a quarter surface can be obtained by facing an angle in the first phase region. The symmetrical relation can reduce the amount of memory used if an angle corresponding to the first phase region is stored in the memory.

Table 1 shows the symmetrical relation according to the current embodiment of the present invention. Referring to Table 1, a phase representative value x corresponding to the I/Q component data is extracted from a look-up table storing a phase representative value of the first phase region when the I/Q component data is located in the $m^{th}$ phase region.

TABLE 1

| Phase Regions | Phase Values of I/Q Component Data |
|---|---|
| First Phase Region (A)(0~π/4) | x |
| Second Phase Region (B)(π/4~π/2) | π/2 − x |
| Third Phase Region (C)(π/2~3π/4) | π/2 + x |
| Fourth Phase Region (D)(3 π/4~π) | π − x |
| Fifth Phase Region (H)(−π~−3π/4) | −π + x |
| Sixth Phase Region (G)(−3 π/4~−π/2) | −π/2 − x |
| Seventh Phase Region (F)(−π/2~−π/4) | −π/2 + x |
| Eighth Phase Region (E)(−π/4~−0) | −x |

Figure 4:
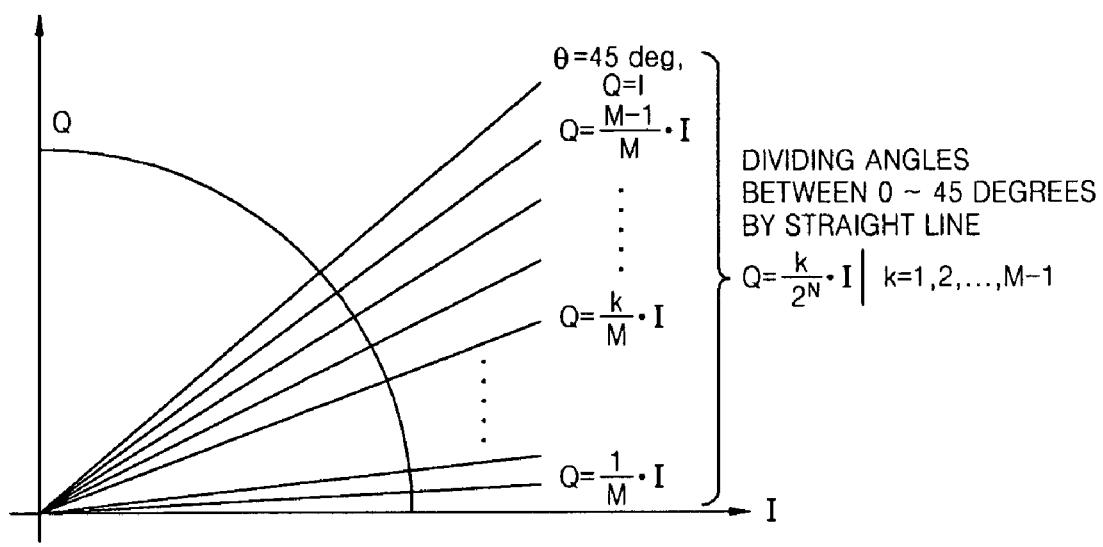
FIG. 4 is a graph for explaining a concept of a look-up table according to an embodiment of the present invention.

FIG. 4 is a graph for explaining a concept of a look-up table according to an embodiment of the present invention. The look-up table of the current embodiment of the present invention stores phase representative values corresponding to $2^N$ regions into which a first phase region is divided. Referring to FIG. 4, the first phase region is divided by a straight line having $k/2^N$ (k=1, 2, through to $2^N−$). The first phase region is divided by multiplication by the radix of a binary number, which requires much less complexity of calculation than the first phase region that is equally divided into N regions. The look-up table outputs a phase representative value corresponding to an input N bit address. The N bit address can be obtained according to the low complexity of calculation using a binary search method.

Figure 5:
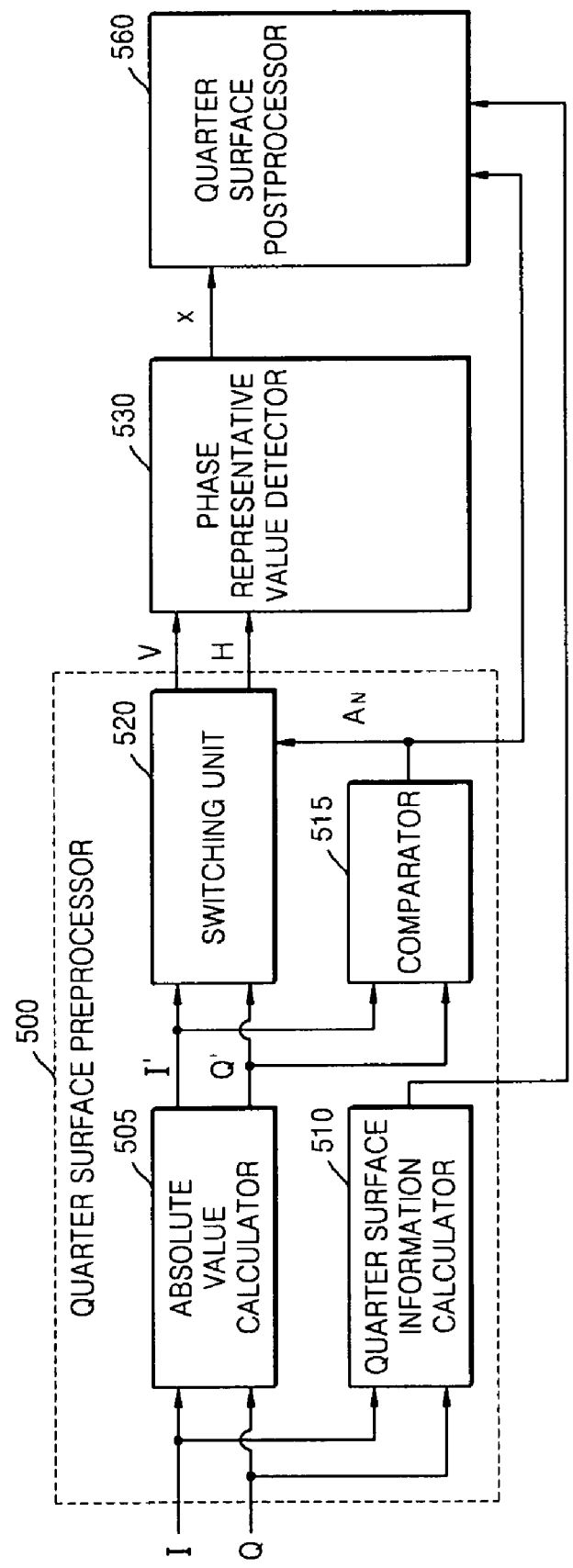
FIG. 5 is a block diagram of a phase calculation apparatus using a binary search process according to an embodiment of the present invention.

FIG. 5 is a block diagram of a phase calculation apparatus using a binary search method according to an embodiment of the present invention. Referring to FIG. 5, the phase calculation apparatus comprises a quarter surface preprocessor 500, a phase representative value detector 530, and a quarter surface postprocessor 560.

The quarter surface preprocessor 500 receives a complex signal comprising I component data and Q component data, determines the bigger one between an absolute value of the I component data and an absolute value of the Q component data as horizontal component data and the smaller one between the absolute value of the I component data and the absolute value of the Q component data as perpendicular component data, and detects information on a phase region in which a phase according to the I/Q component data is located among an $m^{th}$ (m=1 to 8) phase region in which a value between (m−1) π/4 and m π/4 is located. The information on the phase region indicates a phase region in which the phase according to the I/Q component data is located among the eight phase regions. For example, the information on the phase region is information on a quarter surface of the I/Q component data and the absolute values of the I component data and the Q component data. The quarter surface preprocessor 500 that uses the information on the phase region comprises an absolute value calculator 505, a quarter surface information calculator 510, a comparator 515, and a switching unit 520.

The absolute value calculator 505 calculates I' which is the absolute value of the I component data and Q' which is the absolute value of the Q component data. The quarter surface information calculator 510 detects a quarter surface in which the phase according to the I/Q component data is located among first through fourth quarter surfaces and outputs information on the detected quarter surface. The comparator 515 compares the I' which is the absolute value of the I component data and the Q' which is the absolute value of the Q component data and outputs $A_N$ as the result of the comparison. The information on the phase region is the information on the quarter surface and the comparison result, which correspond to the phase region in which the phase according to the I/Q component data is located among the eight phase regions. The switching unit 520 provides the phase representative value detector 530 with the bigger one between the absolute value of the I component data and the absolute value of the Q component data as horizontal component data H and the smaller one between the absolute value of the I component data and the absolute value of the Q component data as perpendicular component data V.

The phase representative value detector 530 detects phase representative values x corresponding to the horizontal component data and the perpendicular component data.

The quarter surface postprocessor 560 calculates the phase values of the I/Q component data, based on the detected information on the phase region and the detected phase representative value x. In detail, the quarter surface postprocessor 560 calculates the phase values of the I/Q component data, based on the information on the phase region indicating the phase region in which the phase according to the I/Q component data is located among the eight phase regions and based on the detected phase representative values x using the symmetrical relation shown in Table 1.

Figure 6:
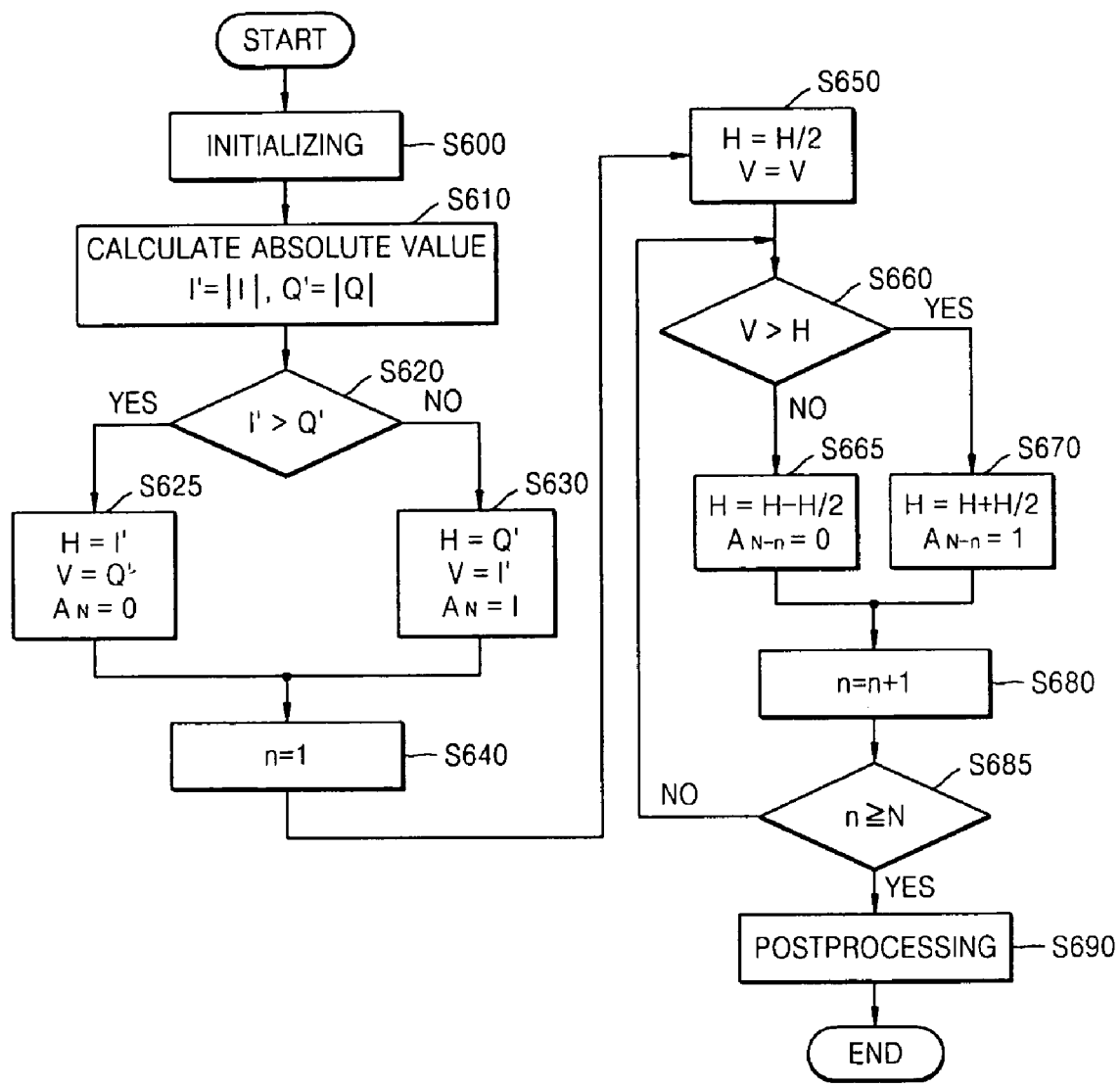
FIG. 6 is a flowchart illustrating a binary search process of the phase calculation apparatus illustrated in FIG. 5.

FIG. 6 is a flowchart illustrating a binary search process of the phase calculation apparatus illustrated in FIG. 5. I component data and Q component data have values I/Q, respectively.

Referring to FIG. 6, the phase calculation apparatus is initialized (Operation 600). The initialized information is N and n. N is a value representing the number of binary searches performed in order to obtain desired phase detection precision and corresponds to the bit resolution of an address that will be described later. The initialized information n is a kind of counter and is set to 0. In Operation 600, it is determined how many phases ($2^N$) of the values I/Q are equally divided ($2^N$) in order to guarantee the precision of the phase. For example, if the phase detection precision is θ, the inequality θ<(π/4)/$2^N$ is satisfied.

The quarter surface preprocessor 500 performs Operations 610 through 630.

In Operation 610, the absolute value calculator 505 calculates an absolute value I' of the I component data and an absolute value Q' of the Q component data. The quarter surface information calculator 510 detects a quarter surface in which the phase of the I/Q component data is located among first through fourth quarter surfaces based on code values of the I/Q, and outputs information on the detected quarter surface.

In Operation 620, the comparator 515 compares the absolute value I' and Q; and outputs a comparison result.

In Operations 625 and 630, the switching unit 520 provides the phase representative value detector 530 with the bigger one between the I' and Q' as horizontal component data H and the smaller one between the I' and Q' as perpendicular component data V, and outputs the comparison result as a value of $A_N$. According to the current embodiment of the present invention, if I'>Q', $A_N$=0, and if I'≦Q', $A_N$=1. If I'≦Q', since (I',Q') is between 45 to 90 degrees, the switching unit 520 swaps the values I' and Q' in order to forcibly locate a coordinate (H,V) between 0 to 45 degrees.

In Operation 640, the counter value n increases and is set to 1.

The phase representative detector 530 performs Operations 650 through 685 to calculate a bit value $A_{N-n}$ (n=1, through to N) that forms an N bit address ($A_{N-1}A_{N-2}$ to $A_0$). The phase representative detector 530 calculates new values of H and V via a right shift arithmetic operation (Operation 650), and compares the size of the current values of H and V (Operation 660). The comparison process corresponds to a process of detecting a plane in which the current coordinate (H,V) is located between two planes divided by a straight line y=(1/$2^n$)x.

Figure 7:
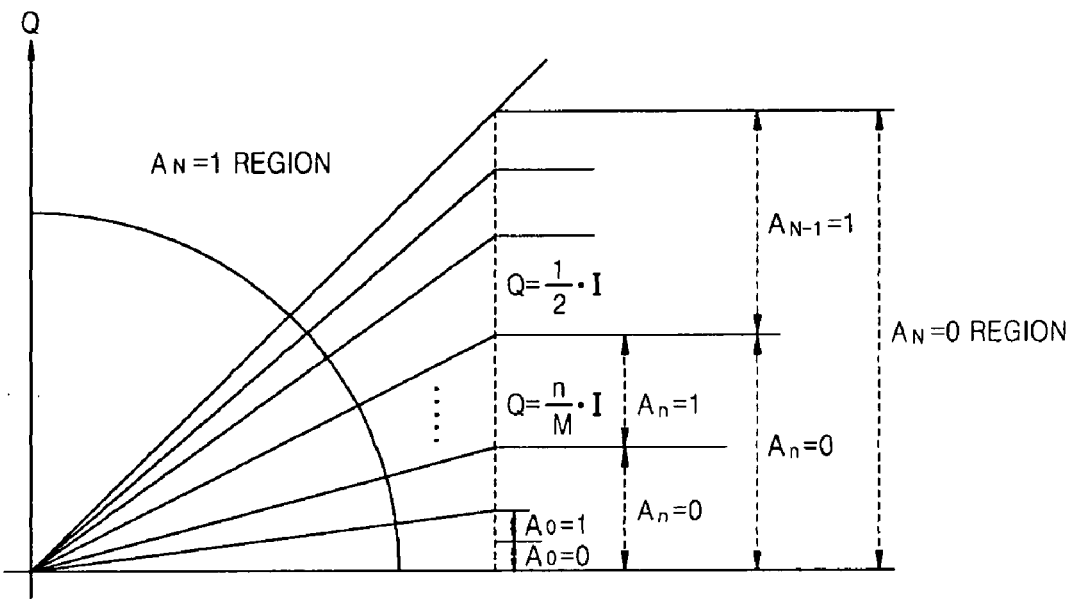
FIG. 7 is a graph for explaining a bit value forming an N bit address.

FIG. 7 is a graph for explaining a bit value forming an N bit address.

The quarter surface postprocessor 560 calculates a phase value of I/Q using a phase representative value corresponding to the calculated N bit address value, $A_N$, and the information on the quarter surface (Operation 690).

A process of detecting a phase according to (I=1, Q=−7) will now be described when phase detection precision is 6°. 6°<(π/4)/$2^N$ corresponds to N>$\log_2$(7.5) and a minimum value of N satisfying N>$\log_2$(7.5) is 3. In detail, in Operation 600, the phase calculation apparatus is initialized to N=3, and a memory that stores phase representative values having an N=3 bit address and $2^3$ partial regions is prepared. The phase representative values stored in the memory are shown in Table 2. The memory is included in the phase representative detector 530 according to the current embodiment of the present invention.

In Operation 610, the absolute value calculator 505 calculates that I'=1 and Q'=7, and the quarter surface information calculator 510 outputs the information on the quarter surface indicating that the phase of the I/Q component data is located in a fourth quarter surface. In Operations 620 and 630, the switching unit 520 calculates that H=7, V=1, and $A_3$=1.

In Operations 640 through 685, $A_2A_1A_0$=001 which is a 3 bit address and is calculated so that the phase representative detector 530 outputs 10.581° corresponding to $A_2A_1A_0$=001 with reference to Table 2.

On Operation 690, the quarter surface postprocessor 560 can determine that (I,Q) is located in a seventh phase region according to the information on the quarter surface and $A_3$=1, and calculates −79.419° (=−90°+10.581°) which is the phase of (I,Q) based on 10.581° and the arithmetic operation shown in Table 2.

TABLE 2

| Address (N = 3) | Partial Regions Corresponding to Addresses | Phase Representative Values of Partial Regions |
|---|---|---|
| 000 | 0°~7.125° | 3.563° |
| 001 | 7.125°~14.036° | 10.581° |
| 010 | 14.036°~20.555° | 17.296° |
| 011 | 20.555°~26.555° | 23.555° |
| 100 | 26.555°~32.005° | 29.280° |
| 101 | 32.005°~36.870° | 34.438° |
| 110 | 36.870°~41.186° | 39.028° |
| 111 | 41.186°~45° | 43.093° |

Figure 8:
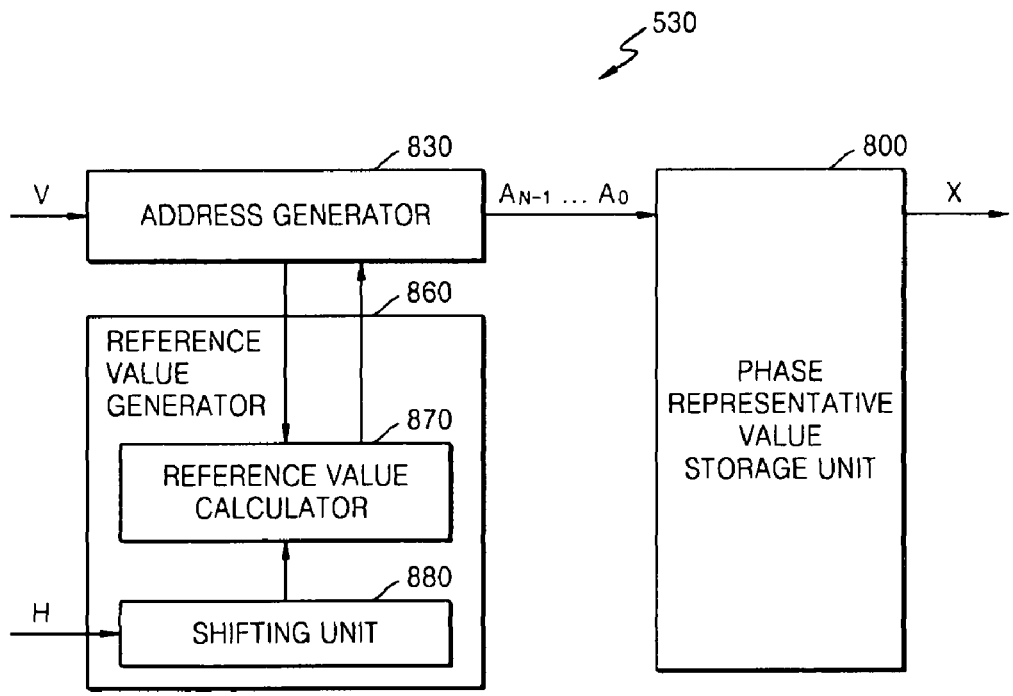
FIG. 8 is a block diagram of a phase representative value detector illustrated in FIG. 5.

FIG. 8 is a block diagram of the phase representative value detector 530 illustrated in FIG. 5. Referring to FIG. 8, the phase representative value detector 530 comprises a phase representative value storage unit 800, an address generator 830, and a reference value generator 860.

The phase representative value storage unit 800 stores phase representative values corresponding to each of $2^N$ partial regions that a first phase surface is divided into, and provides the quarter surface postprocessor 560 with the phase representative values corresponding to input N bit addresses. In detail, the phase representative value storage unit 800 stores the phase representative values shown in Table 2 and outputs the phase representative values corresponding to the N bit address inputs.

The address generator 830 determines, if perpendicular component data is larger than $n^{th}$ (n=1, through to N) reference value, a value of $A_{N-n}$ as a first binary value, or if the perpendicular component data is smaller than or identical to the $n^{th}$ (n=1, ..., N) reference value, the value of $A_{N-n}$ as a second binary value, and generates the N bit addresses. The first and second binary values are 0 and 1, respectively.

The reference value generator 860 provides the address generator 540 with ½ of the perpendicular component data as a first reference value, if the value of $A_{N-n}$ is the first binary value, provides ⅔ of the $n^{th}$ (n=1, through to N-1) reference value as the $n^{th}$ (n=2, through to N) reference value, and, if the value of $A_{N-n}$ is the second binary value, provides ½ of the $n^{th}$ (n=1, through to N-1) reference value as the $n^{th}$ (n=2, through to N) reference value. The reference value generator 860 comprises a shifting unit 880 that right shifts the perpendicular component data by n (n=1, through to N) bits and calculates an $n^{th}$ shift value, and a reference value calculator 870 that provides the address generator 830 with a first shift value as the first reference value, if the value of $A_{N-n}$ is the first binary value, the sum of the n−1$^{th}$ reference value and the $n^{th}$ shift value as the $n^{th}$ (n=2, through to N) reference value, and, if the value of $A_{N-n}$ is the second binary value, the difference of the n−1$^{th}$ reference value and the $n^{th}$ shift value as the $n^{th}$ (n=2, through to N) reference value.

Figure 9:
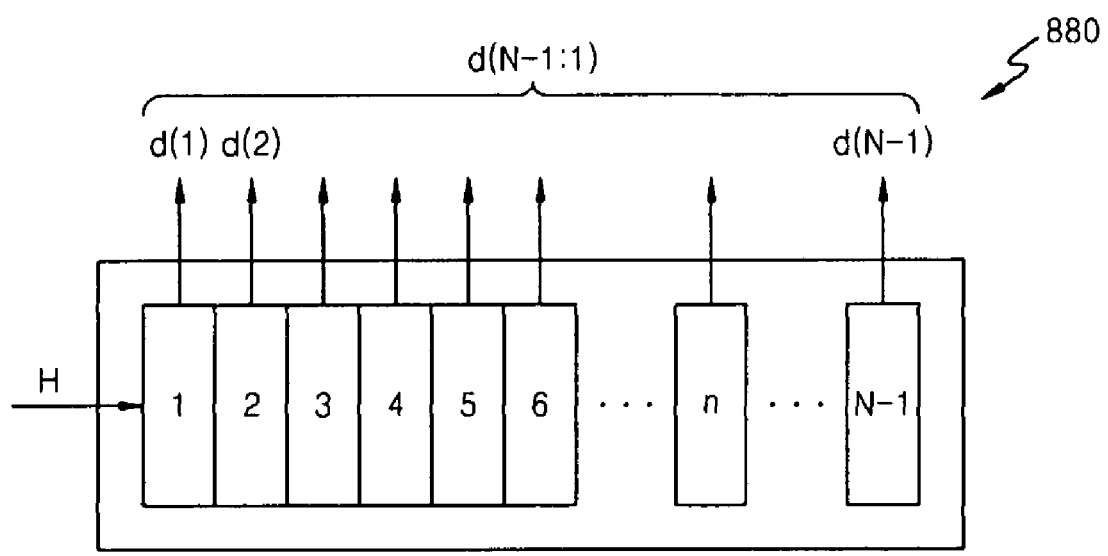
FIG. 9 is a diagram illustrating the constitution of a shifting unit illustrated in FIG. 8.

FIG. 9 is a diagram illustrating the constitution of the shifting unit 880 illustrated in FIG. 8. Referring to FIG. 9, the shifting unit 880 outputs d(1), d(2), through to d(N−1) which are data values obtained by right shifting input horizontal component data by 1, 2, through to N−1 bits. The data values correspond to V/2, V/4, through to $V/2^{N-1}$ and are necessary for Operations 650 and 670 illustrated in FIG. 6.

Figure 10:
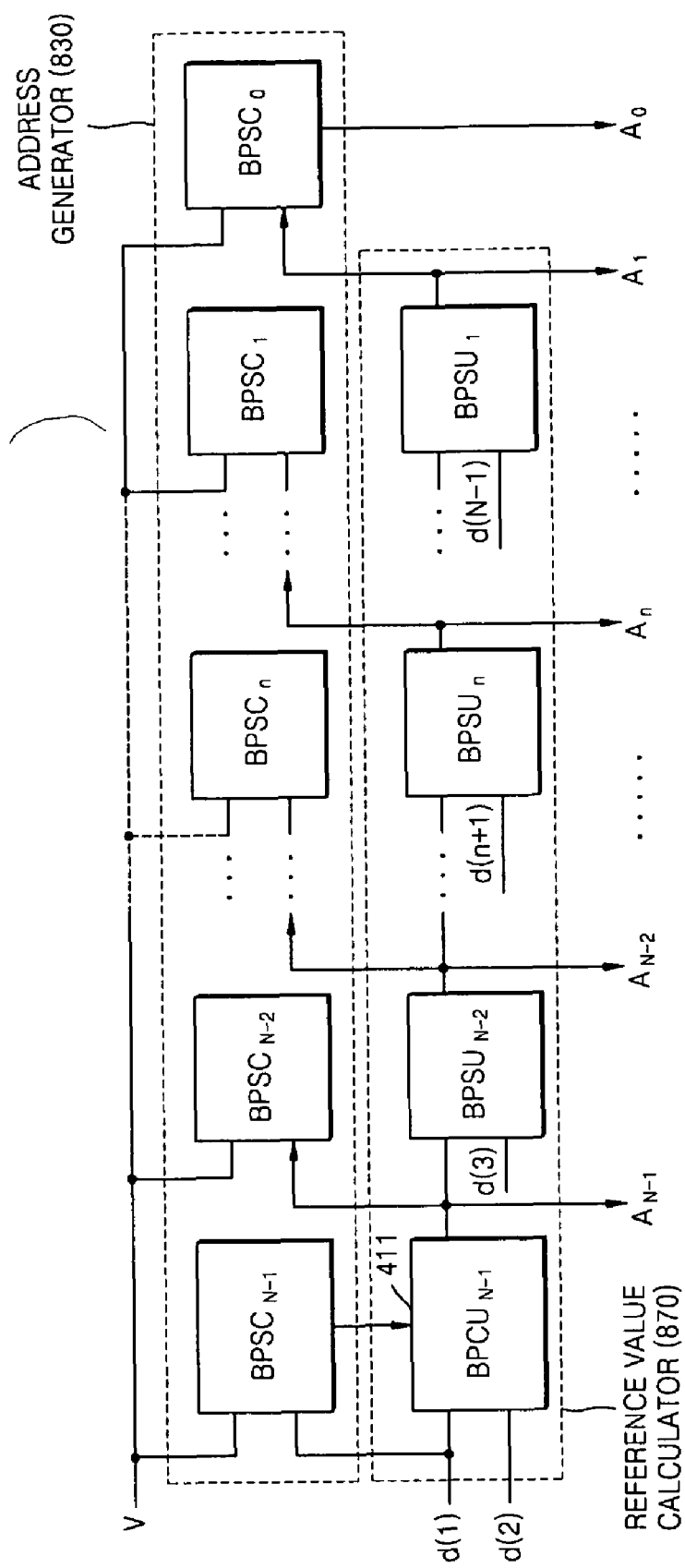
FIG. 10 is a diagram for explaining the operation of a reference value calculator and an address generator illustrated in FIG. 8.
Figure 11:
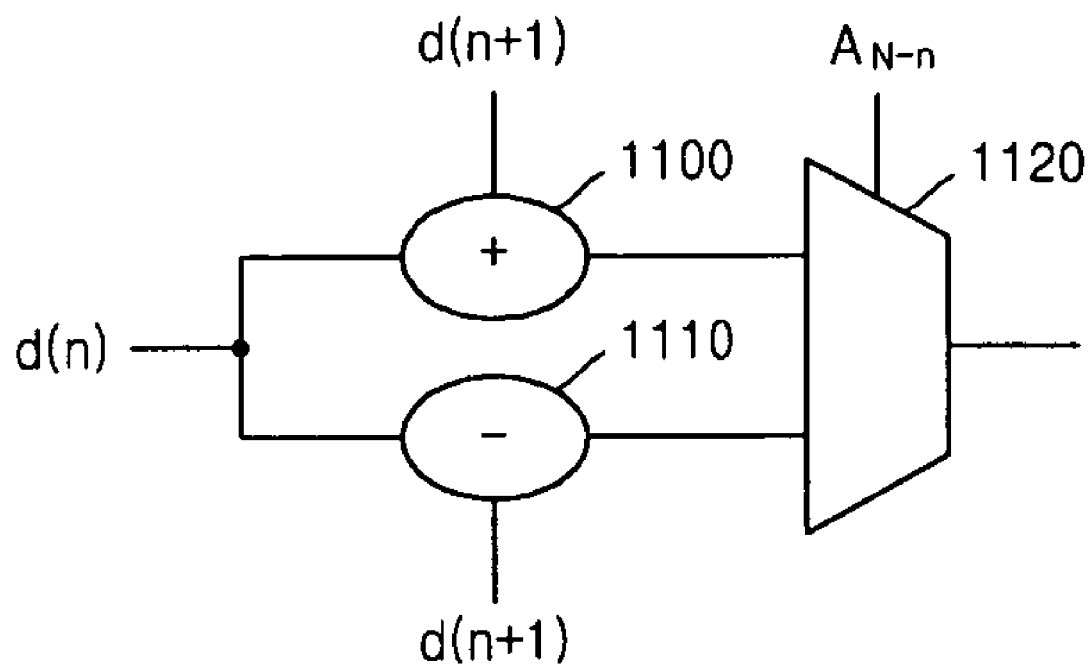
FIG. 11 is a diagram of the constitution of a binary phase calculation unit (BPCU) illustrated in FIG. 10.

FIG. 10 is a diagram for explaining the operation of the reference value calculator 870 and the address generator 830 illustrated in FIG. 8. Referring to FIG. 10, d(1), d(2), through to d(N−1) are provided to the reference value calculator 870 in order to generate a reference value having an angle obtained by dividing angles between 0 to 45 degrees by a straight line $$Q = \frac{k}{2^N} \cdot l \bigg|_{k=1,2,...,2^N-1},$$

i.e., a phase comparison threshold value. The reference value calculator 870 comprises a N−1 binary phase calculation unit (BPCU), as illustrated in FIG. 11, for calculating reference values r(1), r(2), through to r(N), and provides the address generator 830 with the calculated reference values. A $BPCU_{N-n}$ 411 calculates a reference value r(n+1) using an arithmetic operation shown in FIG. 11. Referring to FIG. 11, the $BPCU_{N-n}$ 411 comprises an adder 1100, a subtractor 1110, and a multiplexer 1120. The multiplexer 1120 outputs output data of the subtractor 1110 if $A_{N-n}$ is 0, and output data of the adder 1100 if $A_{N-n}$ is 1. The operation of the multiplexer 1120 corresponds to Operations 665 and 670 illustrated in FIG. 6.

The address generator 830 comprises an N binary phase selection comparator (BPSC), compares the reference values r(1), r(2), through to r(N) provided by the reference value calculator 870 and the horizontal component data, and generates N bit addresses. For example, the $BPSC_N$ outputs $A_{N-n}=1$ if the horizontal component data is larger than the r(n), and $A_{N-n}=0$ if the horizontal component data is smaller than or identical to the r(n).

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code and code segments for accomplishing the present invention can be easily construed by programmer skilled in the art to which the present invention pertains.

According to the present invention, angles of many input I/Q component data values having the same phase cannot be redundantly stored in a memory, and an angle between 0 to 45 degrees other than an angle between 0 to 90 degrees can be stored in the memory, thereby reducing the amount of memory required. The present invention has a low complexity of calculation and excellent phase detection performance and is not dependent on the number of bits of input I/Q component data, thereby reducing loss of phase detection precision according to the quantization of the input I/Q component data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A phase calculation apparatus comprising:
   a quarter surface preprocessor determining the bigger one between an absolute value of I component data and an absolute value of Q component data as horizontal component data and the smaller one as perpendicular component data, and detecting information on a phase region indicating an $m^{th}$ (m=1, through to 8) phase region (the $m^{th}$ phase region is between $(m-1)\pi/4$ and $m\pi/4$) in which the I/Q component data are located;

a phase representative value detector detecting phase representative values x corresponding to the horizontal component data and the perpendicular component data;

a quarter surface postprocessor calculating phase values of the I/Q component data based on the detected information on the phase region and the detected phase representative values x using binary search, wherein the quarter surface postprocessor comprises:

a phase representative value storage unit storing phase representative values corresponding to phases of $2^N$ partial regions into which a first phase region is divided, and outputting phase representative values corresponding to input addresses $A_{N-1}A_{N-2}$ through to $A_0$ among the stored phase representative values;

a reference value generator that outputs N reference values, wherein N is an integer greater than one; and an address generator determining, if the perpendicular component data is larger than an $n^{th}$ (n=1, through to N) reference value of the N reference values received from the reference value generator, setting a value of $A_{N-n}$ to a first binary value, and if the perpendicular component data is smaller than or equal to the $n^{th}$ (n=1, through to N) reference value, setting the value of $A_{N-n}$ to a second binary value, and generating an address;

wherein the reference value generator provides the address generator with 1/2 of the perpendicular component data as a first reference value of the N reference values, if the value of $A_{N-n}$ is equal to the first binary value and the reference value generator provides the address generator with 3/2 of the perpendicular component as the first reference value of the N reference values if the value of $A_{N-n}$ is equal to the second binary value.

2. The phase calculation apparatus of claim 1, wherein information on quarter surfaces of the I/Q component data and a result obtained by comparing the absolute value of the I component data and the absolute value of the Q component data are used as the information on the phase region.

3. The phase calculation apparatus of claim 1, wherein the quarter surface postprocessor, if the I/Q component data belong to first through eighth phase regions, determines x, $\pi/2-x, \pi/2+x, \pi-x, -\pi+x, -\pi/2-x, -\pi/2+$, and $-x$ as the phase values of the I/Q component data, based on the information on the phase region.

* * * * *